United States Patent
Rink et al.

(10) Patent No.: US 12,234,911 B2
(45) Date of Patent: Feb. 25, 2025

(54) SEAL ASSEMBLY FOR VEHICLE

(71) Applicant: Ford Global Technologies, LLC, Dearborn, MI (US)

(72) Inventors: Alexander Robert Rink, Royal Oak, MI (US); Nathaniel Conti, Canton, MI (US); Samuel Jeffrey Tomlinson, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 50 days.

(21) Appl. No.: 18/186,351

(22) Filed: Mar. 20, 2023

(65) Prior Publication Data
US 2024/0318721 A1    Sep. 26, 2024

(51) Int. Cl.
*F16J 15/02*      (2006.01)
*H01M 50/308*  (2021.01)
*F16K 17/02*      (2006.01)

(52) U.S. Cl.
CPC ............ *F16J 15/021* (2013.01); *F16K 17/02* (2013.01); *H01M 50/308* (2021.01)

(58) Field of Classification Search
CPC ........ F16J 15/021; F16J 15/022; F16J 15/061; F16J 15/104; F16K 17/02; H01M 50/308
See application file for complete search history.

(56) References Cited

U.S. PATENT DOCUMENTS

| | | | |
|---|---|---|---|
| 2,590,264 A | 3/1952 | Meyers et al. | |
| 3,288,164 A | 11/1966 | Clark | |
| 5,022,685 A | 6/1991 | Stiskin et al. | |
| 5,056,801 A * | 10/1991 | Beadle | B60S 1/349 277/606 |
| 5,076,557 A | 12/1991 | Beatenbough et al. | |
| 8,690,161 B2 * | 4/2014 | Cayzac | F16L 5/10 277/606 |
| 11,848,459 B2 * | 12/2023 | Tomlinson | B60L 50/64 |
| 2003/0005644 A1 | 1/2003 | Reithmeyer et al. | |
| 2004/0173976 A1 | 9/2004 | Boggs | |
| 2009/0176416 A1 | 7/2009 | Flynn et al. | |
| 2010/0109259 A1 * | 5/2010 | Cayzac | B60R 16/0222 137/15.01 |

(Continued)

FOREIGN PATENT DOCUMENTS

| CN | 203672609 | 6/2014 |
|---|---|---|
| CN | 203927849 | 11/2014 |

(Continued)

*Primary Examiner* — Nicholas L Foster
(74) *Attorney, Agent, or Firm* — Burris Law, PLLC

(57) ABSTRACT

A seal assembly includes a cap and a seal. The cap includes an engagement structure and a flange. The engagement structure is configured to couple the cap to an enclosure. The flange defines a plurality of openings that are open through a first side of the flange and a second side of the flange. The seal includes a seal body and a plurality of bosses. The seal body engages the second side of the flange and includes a plurality of bosses. Each boss is positioned in a respective opening of the plurality of openings. The seal is compressible against the flange from a relaxed state in which the bosses are flush with the first side of the flange or recessed within the openings and a compressed state in which each boss extends from the respective opening beyond the first side of the flange.

20 Claims, 10 Drawing Sheets

(56) References Cited

U.S. PATENT DOCUMENTS

| | | | |
|---|---|---|---|
| 2016/0305120 A1 | 10/2016 | Radoane | |
| 2020/0180977 A1 | 6/2020 | Baird et al. | |
| 2020/0274112 A1* | 8/2020 | Tomlinson | H01M 50/24 |
| 2024/0047815 A1* | 2/2024 | Rink | H01M 50/3425 |
| 2024/0113363 A1* | 4/2024 | Gupte | H01M 50/264 |

FOREIGN PATENT DOCUMENTS

| | | |
|---|---|---|
| CN | 205399595 | 7/2016 |
| DE | 102013014460 | 4/2014 |
| WO | 2016046410 | 3/2016 |

* cited by examiner

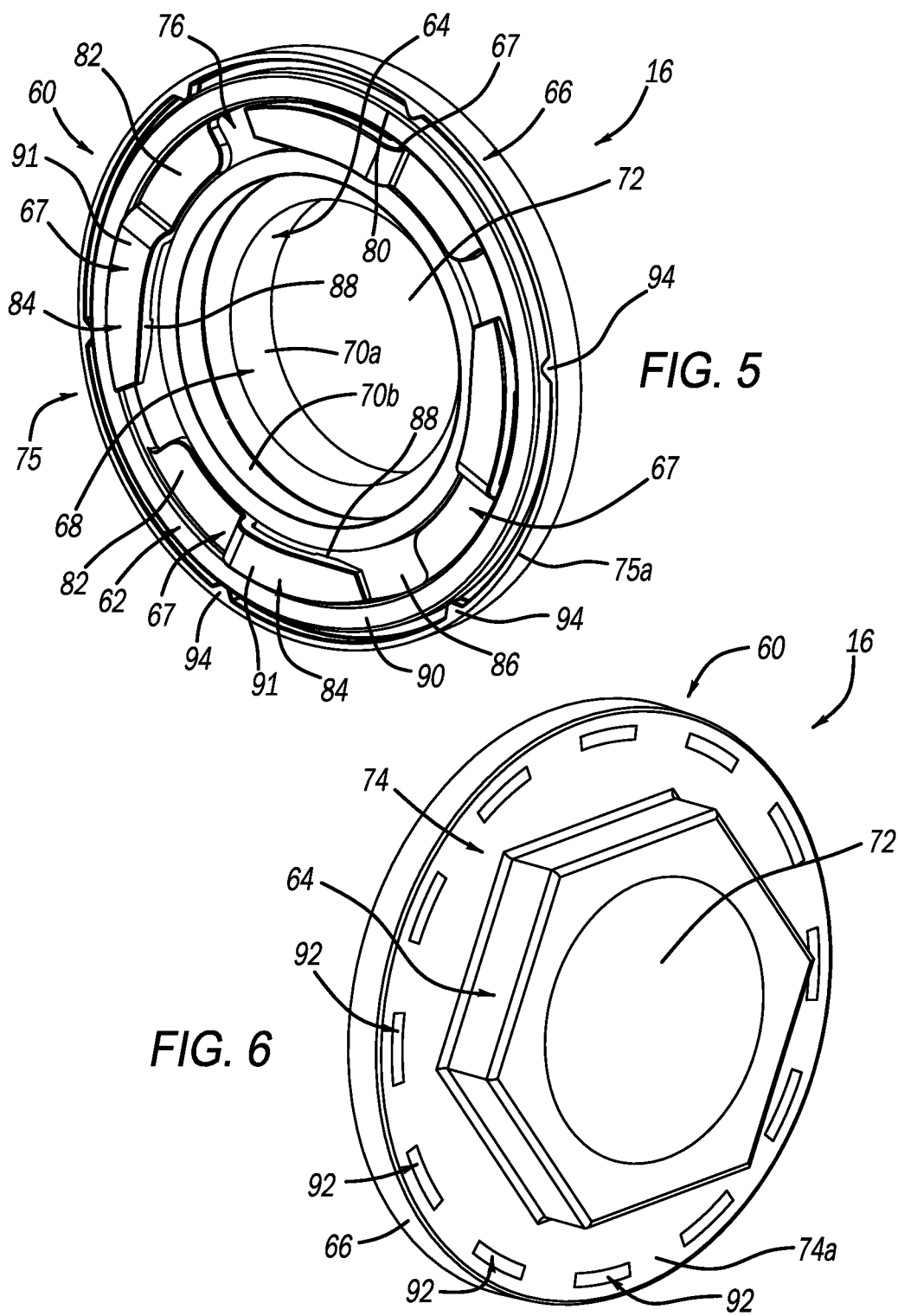

SEAL ASSEMBLY FOR VEHICLE

FIELD

The present disclosure relates to a seal assembly, and more specifically, a seal assembly for a vehicle.

BACKGROUND

The statements in this section merely provide background information related to the present disclosure and may not constitute prior art.

Electric vehicles are driven by one or more rechargeable battery packs having lithium-ion batteries, for example, or any other suitable electrical power storage units. The battery pack includes an enclosure which provides a structural surrounding and a sealed compartment for the batteries and other components such as cooling lines, support brackets and wiring disposed therein or extending therethrough. The battery pack is sealed using one or more seals that must be installed properly to pass a leak test (i.e., a leak test is a procedure of checking a system or apparatus for leaks and is typically carried out after at least a portion of the apparatus has been assembled), for example. Improper installation of the seals may lead to a leak during the leak test requiring disassembly of the battery pack, which is cumbersome and costly.

The present disclosure addresses these and other issues related to seals in electric vehicles.

SUMMARY

This section provides a general summary of the disclosure and is not a comprehensive disclosure of its full scope or all of its features.

In one form, the present disclosure provides a seal assembly that includes cap and a seal. The cap includes an engagement structure and a flange. The engagement structure is configured to couple the cap to an enclosure. The flange defines a plurality of openings that are open through a first side of the flange and a second side of the flange. The seal includes a seal body and a plurality of bosses. The seal body engages the second side of the flange and includes a plurality of bosses. Each boss is positioned in a respective opening of the plurality of openings. The seal is compressible against the flange from a relaxed state in which the bosses are flush with the first side of the flange or recessed within the openings and a compressed state in which each boss extends from the respective opening beyond the first side of the flange.

In variations of the above paragraph, which can be implemented individually or in any combination: the openings are circumferentially spaced apart around a central axis of the cap; the cap includes a body and the flange extends radially outward from the body, the openings extend axially through the flange; the body includes an air permeable membrane that selectively allows fluid to pass therethrough; the body includes a vent valve that selectively allows fluid to pass therethrough; the second side of the flange defines an annular groove; the seal body is a ring received in the annular groove and the plurality of bosses extend from the ring; the engagement structure comprises a plurality of resiliently flexible legs extending from the second side of the flange and configured to couple the cap to the enclosure to inhibit movement of the cap relative to the enclosure; the resiliently flexible legs are circumferentially spaced apart around the flange; further comprising the enclosure; and the cap is made of a polymeric material.

In another form, the present disclosure provides a seal assembly that includes an enclosure, a cap and a seal. The cap is configured to engage the enclosure in a pre-assembly position in which the cap is rotatable relative to the enclosure and an assembled position in which the cap is inhibited from rotating relative to the enclosure. The cap includes a body and a flange extending radially outward from the body. The body is configured to selectively allow fluid to pass therethrough. A plurality of openings extend through the flange of the cap. The seal includes a seal body and a plurality of bosses. The seal body engages the cap and each boss of the plurality of bosses are positioned in a respective opening of the plurality of openings. When the cap is in the pre-assembly position, the bosses are flush with an upper surface of the cap or recessed from the upper surface of the cap, and when the cap is in the assembled position, the seal is compressed such that each boss extends through the respective opening and beyond an upper surface of the cap.

In variations of the above paragraph, which can be implemented individually or in any combination: the openings are circumferentially spaced apart around the flange of the cap; the body includes an air permeable membrane that selectively allows fluid to pass therethrough; the body includes a vent valve that selectively allows fluid to pass therethrough; the flange has an upper side that has the upper surface and a lower side that is opposite the upper side, the lower side defines an annular groove; the seal body is a ring and the plurality of bosses extend from the ring, the ring being received in the annular groove of the flange; a plurality of resiliently flexible legs extending from the lower side of the flange and configured to engage the enclosure when the cap is in the assembled position to inhibit movement of the cap relative to the enclosure, the resiliently flexible legs located radially inwardly of the seal; and the seal and the flange engage an outer flat surface of the enclosure when the cap is in the assembled position.

In yet another form, the present disclosure provides a seal assembly that includes a battery tray, a cap, and a seal. The battery tray defines an aperture. The cap is received in the aperture and is configured to engage the battery tray in a pre-assembly position in which the cap is rotatable relative to the battery tray and an assembled position in which the cap is inhibited from rotating relative to the battery tray. The cap includes a body, a flange, and a plurality of resiliently flexible legs. The body is configured to selectively allow fluid to pass therethrough. The flange extends radially outward from the body and includes an upper side and a lower side. The lower side defines an annular groove. A plurality of openings are circumferentially spaced apart around the flange and extend axially through the flange. The plurality of resiliently flexible legs extend from the lower side of the flange and are configured to engage the battery tray when the cap is in the assembled position to inhibit movement of the cap relative to the battery tray. The seal engages the cap and includes a ring portion and a plurality of bosses extending from the ring portion. The ring portion is disposed in the annular groove. The bosses are positioned in respective openings of the flange. When the cap is in the pre-assembly position, the bosses are flush with an upper side of the cap or recessed below the upper side of the cap, and when the cap is in the assembled position, the seal is compressed such that each boss extends through the respective opening and beyond an upper side of the cap.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
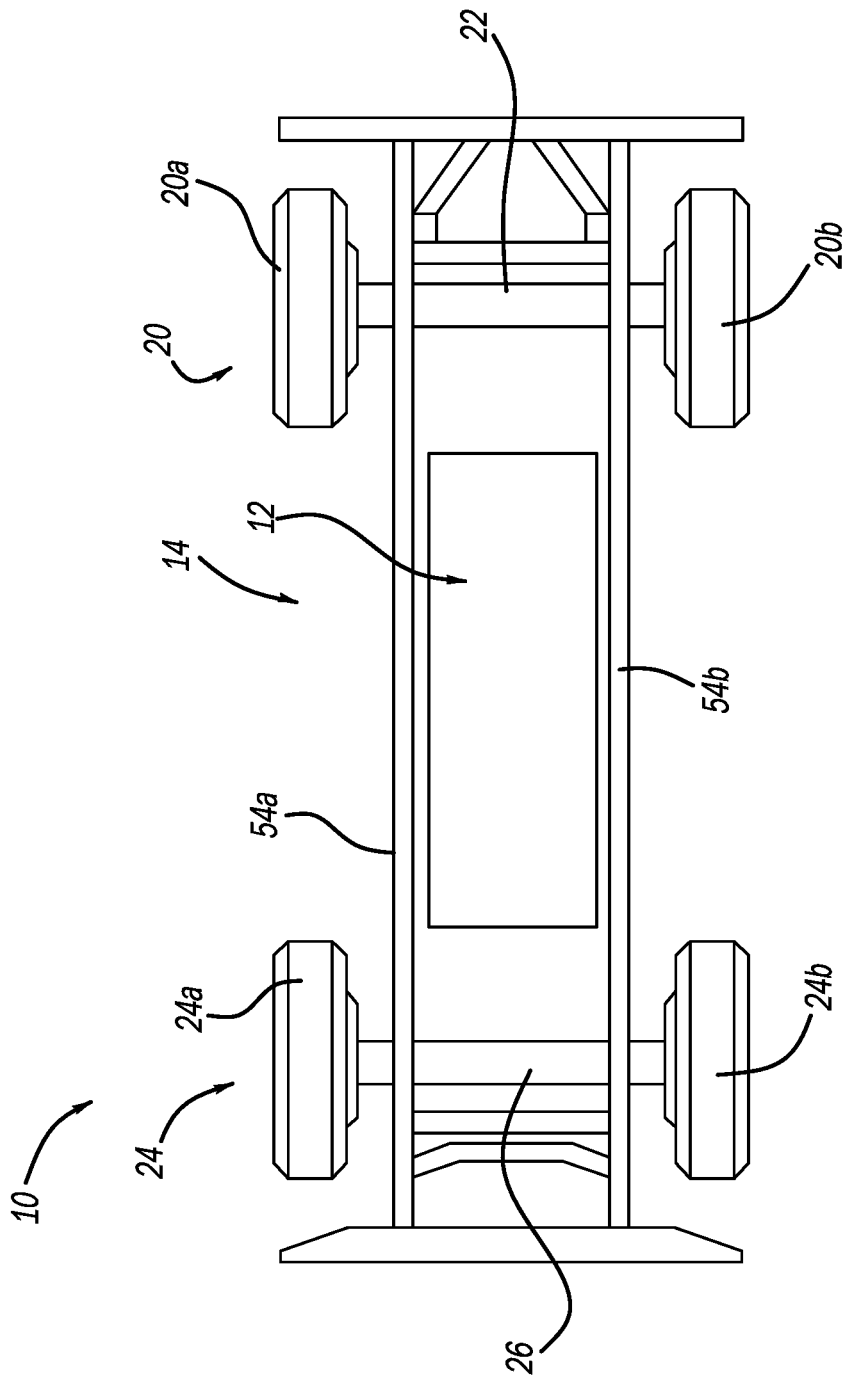
FIG. 1 is a schematic view of a vehicle including a battery pack having seal assemblies according to the principles of the present disclosure.
Figure 2:
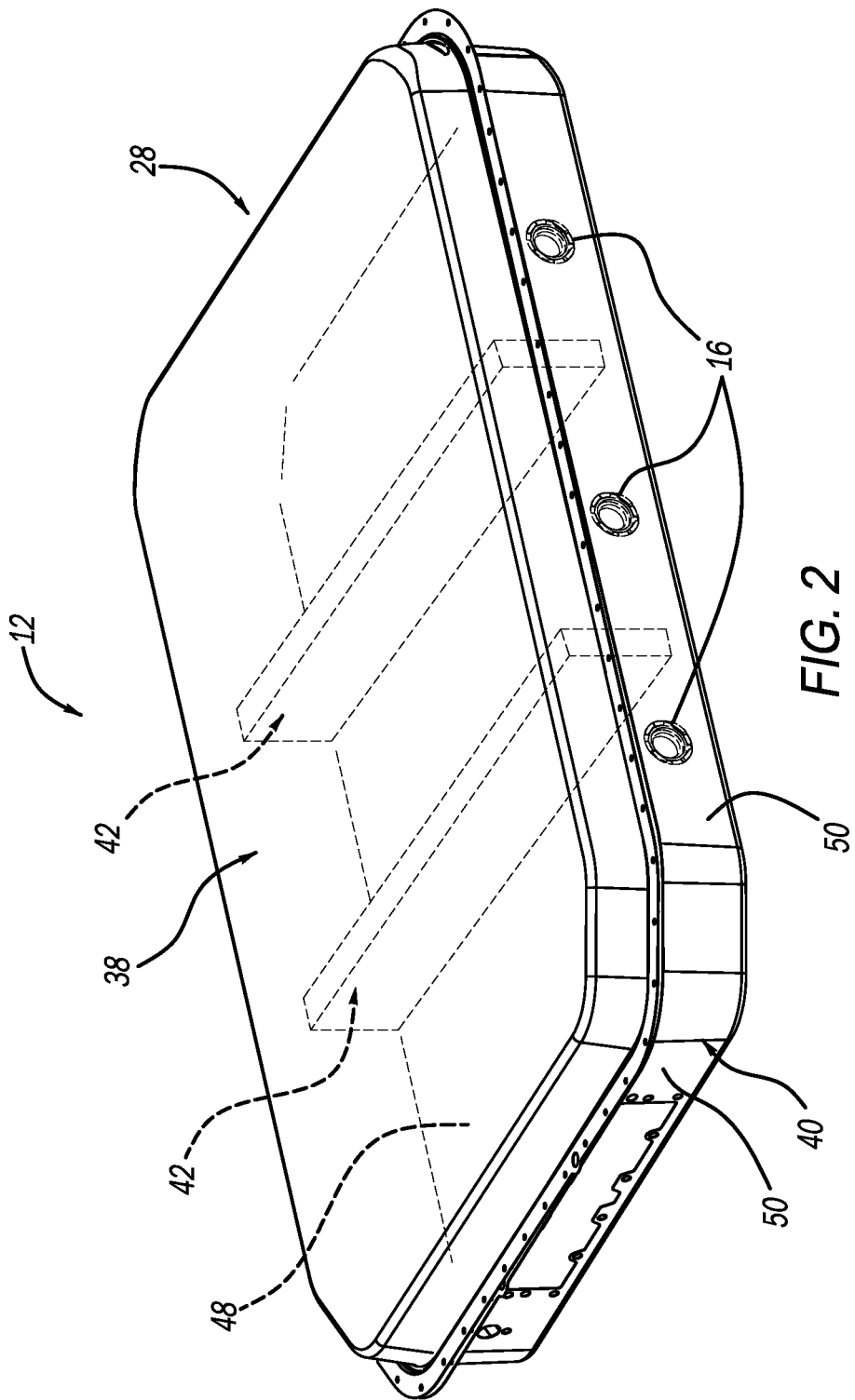
FIG. 2 is a perspective view of the battery pack of FIG. 1 having the seal assemblies secured thereto.
Figure 4:
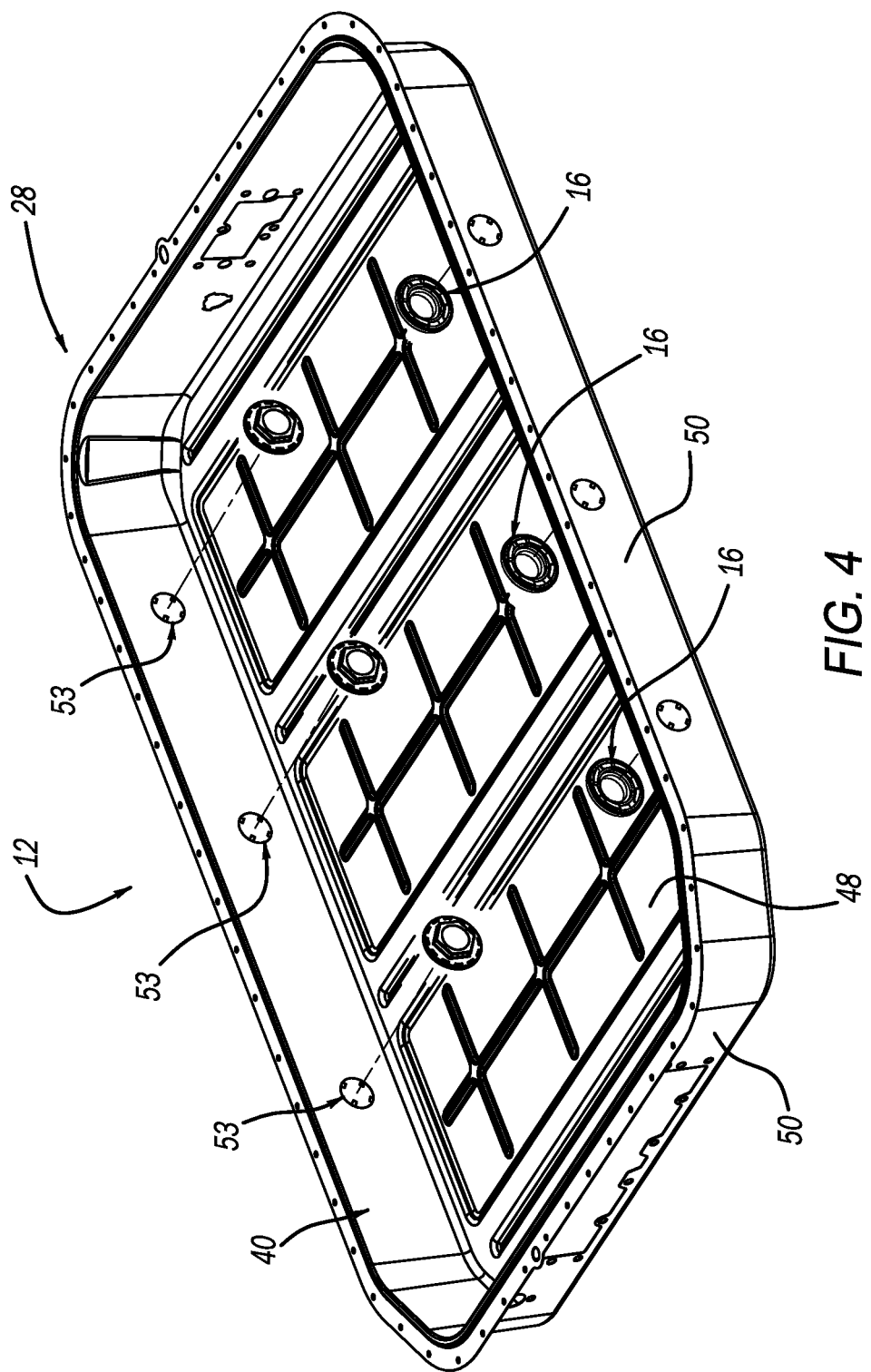
Figure 7:
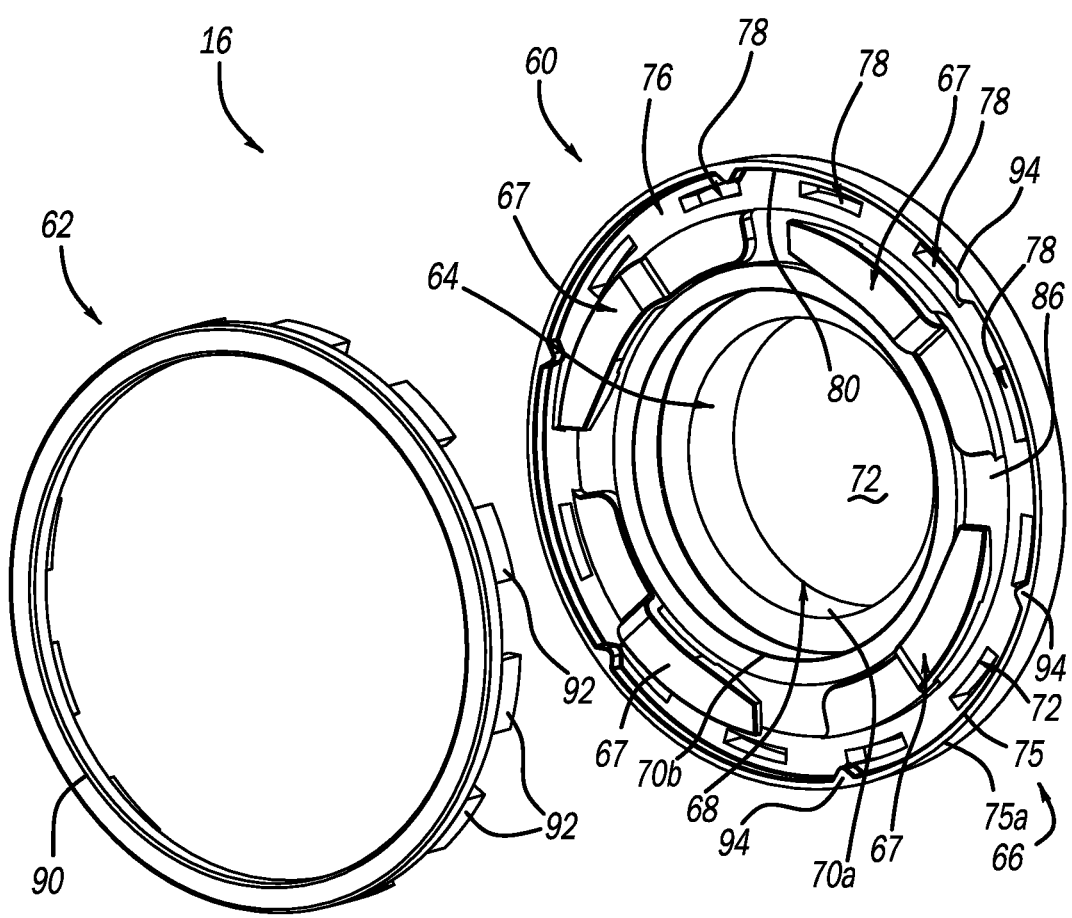
Figure 8:
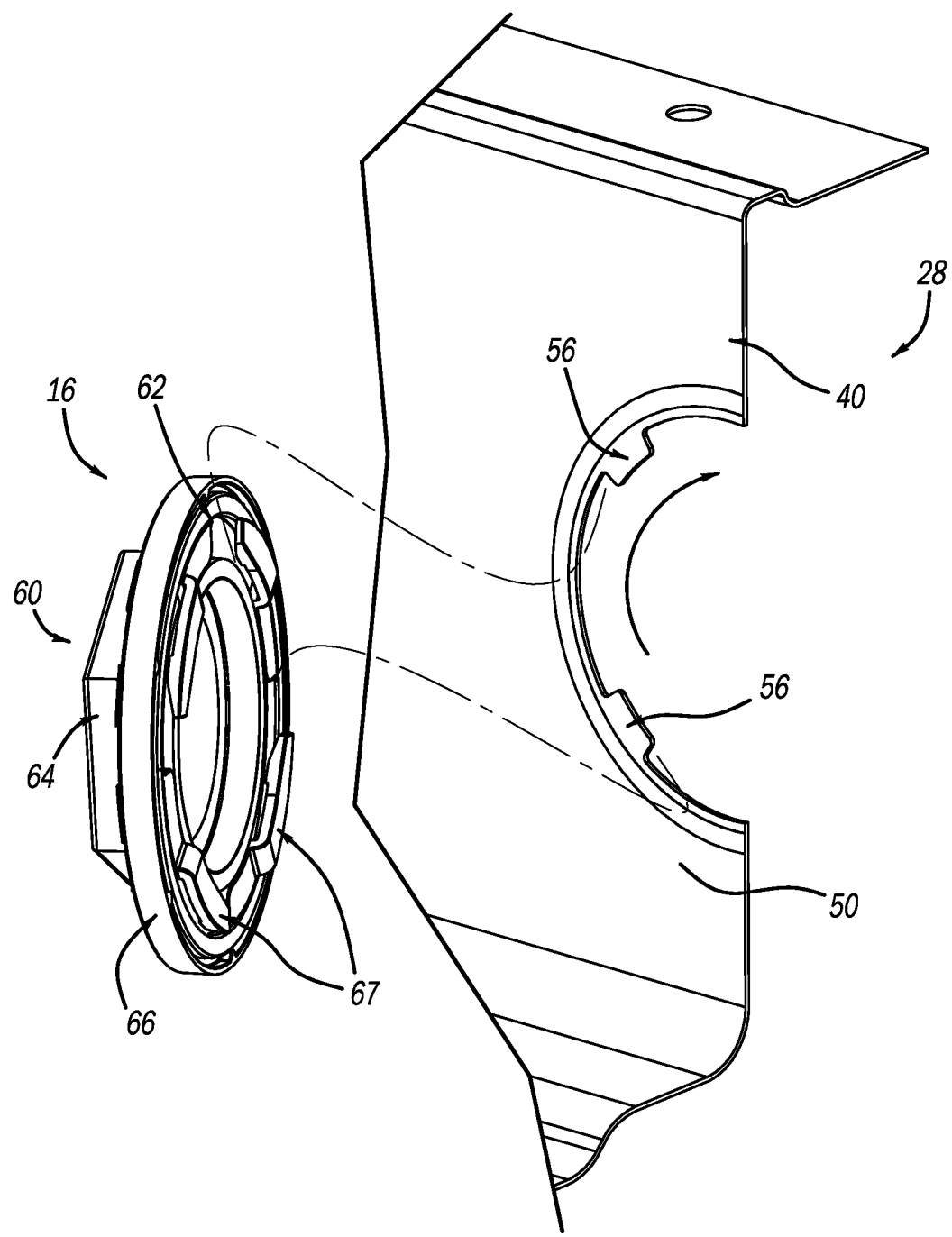
Figure 9:
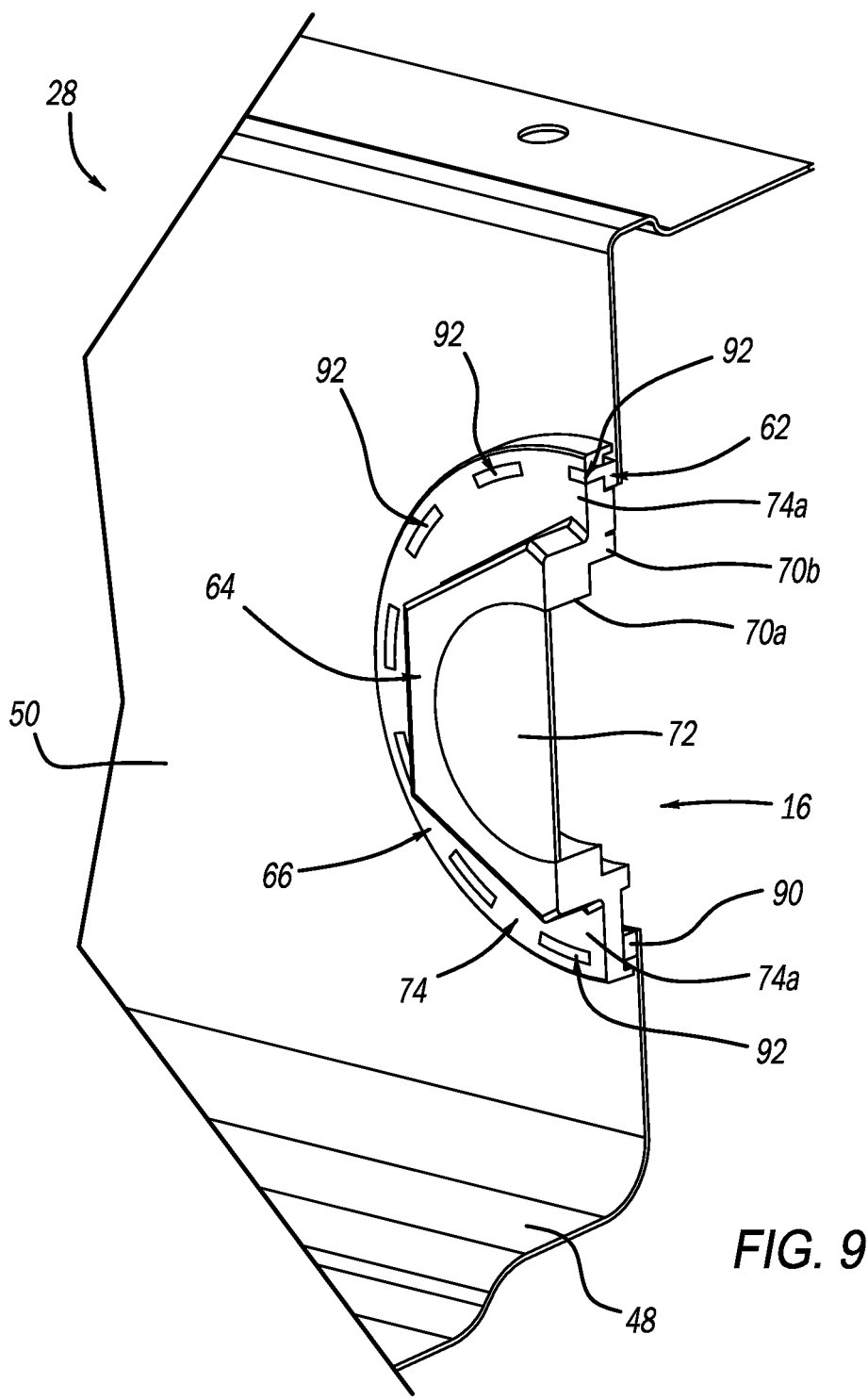
Figure 10A:
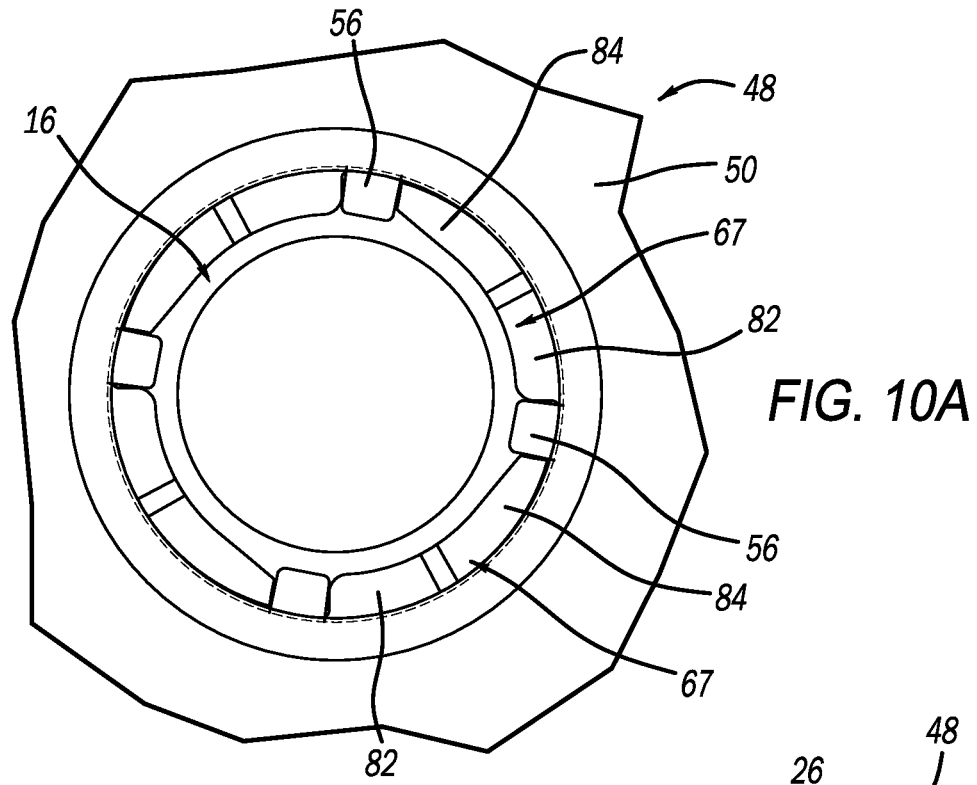
Figure 10B:
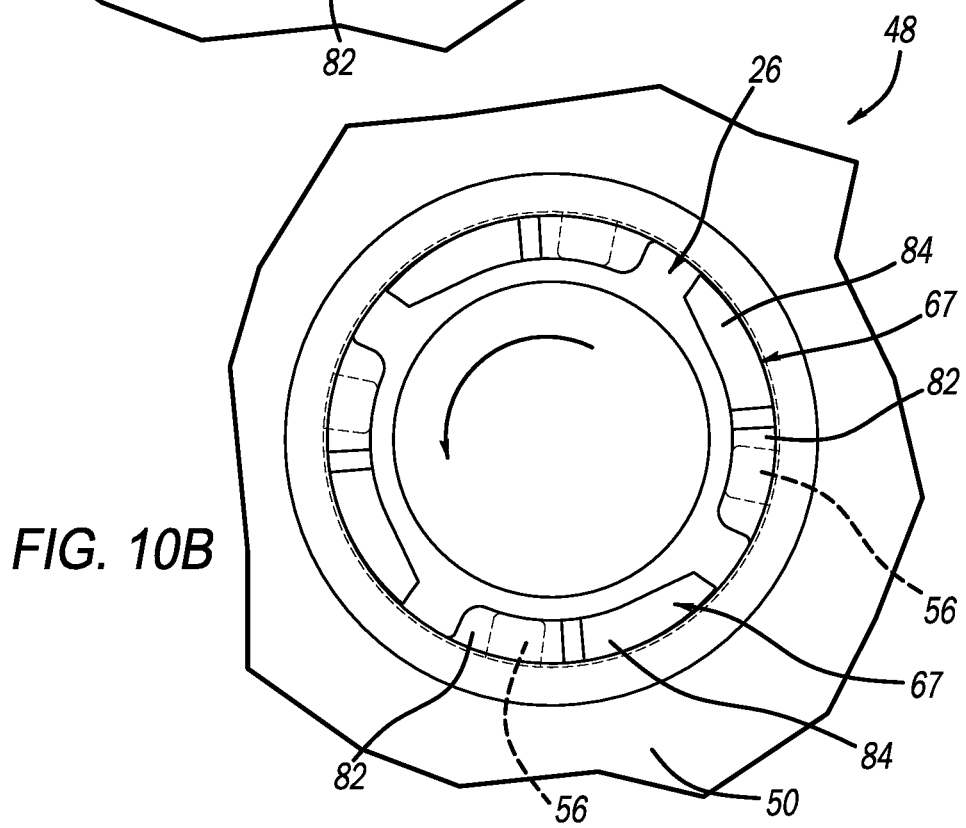
Figure 10C:
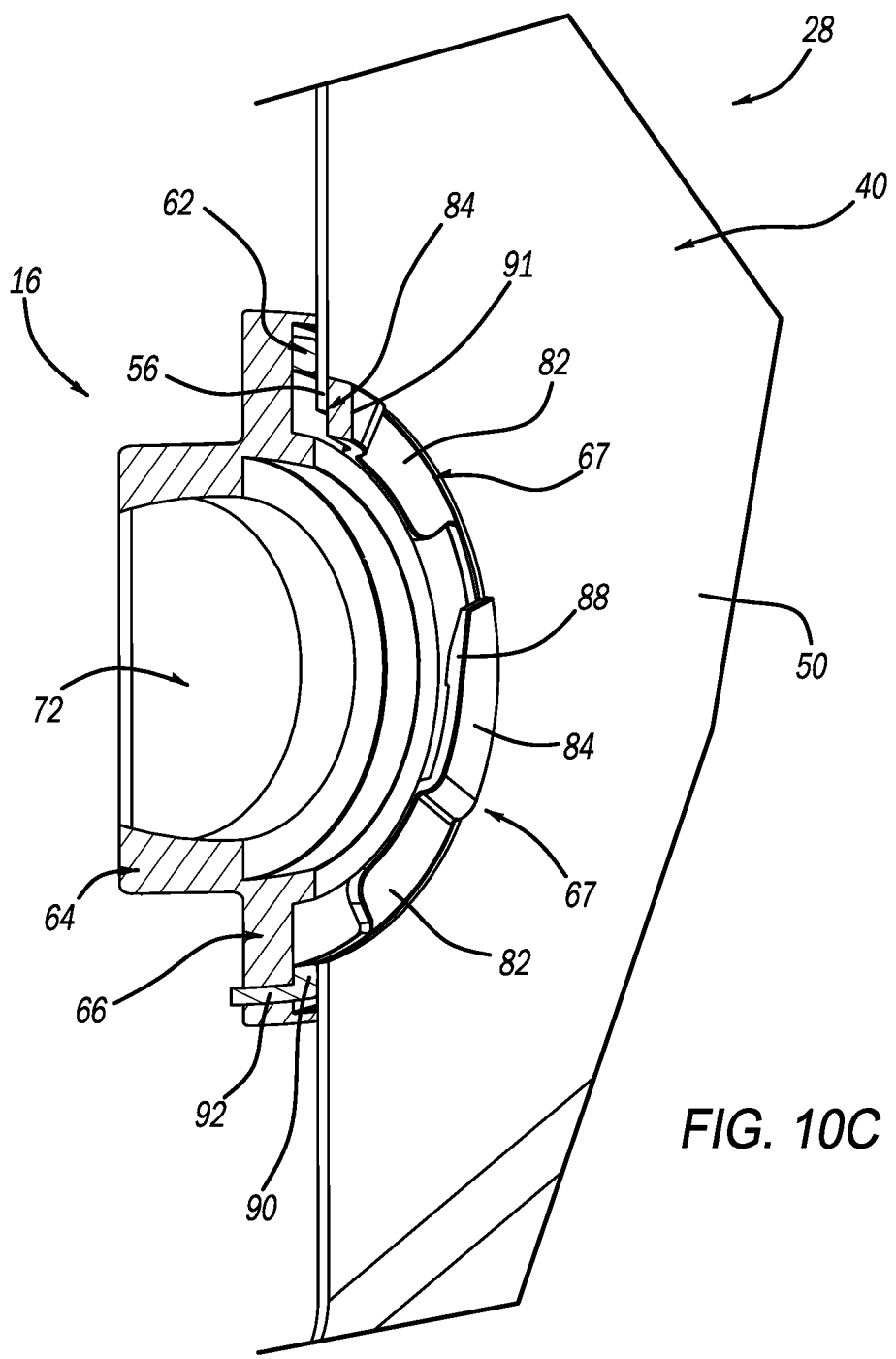

FIG. 4. is a perspective view of the battery pack of FIG. 1 with the seal assemblies exploded therefrom;

FIG. 5 is a perspective view of one seal assembly of FIG. 2;

FIG. 6 is another perspective view of the seal assembly of FIG. 5;

FIG. 7 is an exploded perspective view of the seal assembly of FIG. 5;

FIG. 8 is a cross-sectional perspective view of a portion of the battery pack of FIG. 1 with one seal assembly exploded therefrom;

FIG. 9 is a cross-sectional perspective view of a portion of the battery pack of FIG. 1 with a cap of the seal assembly in a pre-assembly position;

FIG. 10A is a back view of the seal assembly engaging the battery pack of FIG. 1 in a pre-assembly position;

FIG. 10B is a back view of the seal assembly engaging the battery pack of FIG. 1 in an assembled position; and FIG. 10C is a cross-sectional perspective view of a portion of the battery pack of FIG. 1 with the cap of the seal assembly in the assembled position.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

With reference to FIGS. 1 and 2, a vehicle 10 (FIG. 1) such as an electric vehicle is provided. In the example provided, the electric vehicle is a battery electric vehicle (BEV). In other examples, the electric vehicle may be a hybrid electric vehicle (HEV), a plug-in electric vehicle (PHEV), or a fuel cell vehicle. The vehicle 10 includes a battery housing assembly 12 (also referred to herein as a battery pack), a vehicle frame 14 (FIG. 2) and a plurality of seal assemblies 16 (FIG. 2). The battery housing assembly 12 powers one or more motors to drive a set of drive wheels. For example, the battery housing assembly 12 may power a rear motor (not shown) to drive rear wheels 20a, 20b of a set of rear wheels 20 via a rear axle 22 and/or may power a front motor (not shown) to drive front wheels 24a, 24b of a set of front wheels 24 via a front axle 26.

Figure 3:
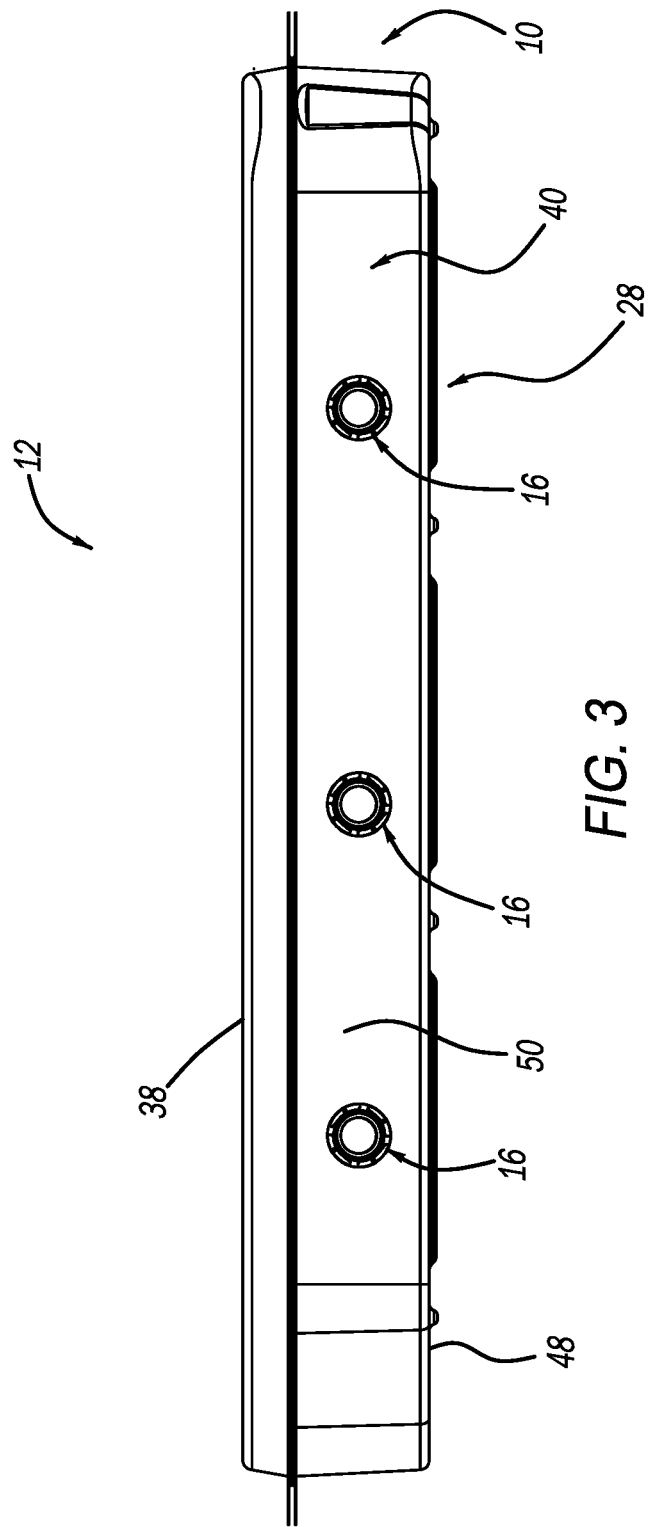
FIG. 3 is a side view of the battery pack of FIG. 1 having the seal assemblies secured thereto.

With reference to FIGS. 2-4, the battery housing assembly 12 includes one or more battery arrays (not shown) and a battery tray or housing 28. The battery tray 28 is an enclosure which provides a structural surrounding and sealed compartment for the battery arrays and other battery components such as cooling lines, support brackets, and wiring disposed therein. The battery arrays may be rechargeable and may include lithium-ion batteries or any other suitable electrical power storage units. In some forms, the battery arrays are stacked on top of each other within the housing 28.

The battery housing 28 may be disposed at various locations of the vehicle 10 and is mounted to the vehicle frame 14. In this way, the battery housing 28 is supported by the vehicle frame 14 and is remote from a passenger cabin (not shown) and cargo compartments (not shown) of the vehicle 10, therefore, not occupying space that would otherwise be available for passengers or cargo. The battery housing 28 includes a lid 38, a body 40, and internal cross members 42 (shown in hidden lines in FIG. 2). The lid 38 at least partially overlaps the body 40 and is removably coupled to the body 40 via mechanical fasteners such as bolts or screws (not shown), for example. In this way, the lid 38 may be removed to service the battery arrays disposed within the battery housing 28.

The body 40 includes a bottom wall or panel 48 and one or more side walls or panels 50. The bottom wall 48 supports the battery arrays disposed within the battery housing 28 and is secured to lower portions of the side walls 50. For example, the bottom wall 48 is secured to the lower portions of the side walls 50 via welding, an adhesive, or any other suitable attachment means. The side walls 50 are manufactured via stamping, for example, and extend in a vertical direction. The side walls 50 define an outer boundary of the body 40 and are secured to each other via welding or an adhesive, for example. It is understood that other methods of manufacturing the body 40 can be used, such as hydroforming or casting for example, and that the side walls 50 may be unitarily formed with the bottom wall 48 instead of attached thereto by an attachment means. A seal (not shown; e.g., a gasket or a fluid-applied seal) is disposed around a periphery of the side walls 50 of the battery housing 28 and is engaged with side walls 50 and the lid 38. In this way, fluids, debris and other materials are inhibited from entering into the battery housing 28. The internal cross members 42 are disposed within the body 40 and extend in a transverse direction of the vehicle 10. The internal cross members 42 may connect opposed side walls 50. The internal cross members 42 abut against the bottom wall 48 of the body 40 and are spaced apart along a longitudinal direction of the vehicle 10.

With reference to FIG. 4, the side walls 50 define a plurality of openings 53 formed therethrough. The openings 53 are formed in the side walls 50 and are located around the body 40 of the battery housing 28. In the example illustrated, the openings 53 have a circular shape. In some forms, the openings 53 may be triangular, square, rectangular, or any other suitable shape. In the example illustrated, a plurality of rectangular-shaped tabs 56 (labeled on FIG. 8) extend radially inward from the side walls 50 into a respective opening 53.

With reference to FIG. 1, the vehicle frame 14 is the main supporting structure of the vehicle 10, to which various components are attached either directly or indirectly. The vehicle frame 14 includes opposed longitudinal rails 54a, 54b. The rails 54a, 54b are spaced apart from each other and may establish a length of the vehicle frame 14.

Returning to FIG. 4, each seal assembly 16 is received in a respective opening 53 formed in the body 40 of the battery housing 28 and is configured to perform one or more functions. That is, in one example, each seal assembly 16 is configured to inhibit fluids, debris and other materials from entering into the battery housing 28 while also providing venting of gases within the battery housing 28 that may be generated by a thermal event (e.g., a thermal event of one of the battery arrays within the battery housing 28).

With reference to FIGS. 5-7, each seal assembly 16 includes a cap 60 and a seal 62. The cap 60 may be made of a polymeric material, for example, and may be manufactured using an injection molding process. In some forms, the cap 60 may be made of a metal material or an elastomeric material, for example. In the example illustrated, the cap 60 is secured to the side walls 50 of the battery tray 28 and located substantially within the battery tray 28 (FIG. 2). In some forms, the cap 60 may be secured to the side walls 50 of the battery tray 28 and located substantially external to the battery tray 28.

With additional reference to FIGS. 8, 9, 10A-10C, the cap 60 is configured to engage the side walls 50 of the battery tray 28 in a pre-assembly position (FIGS. 9 and 10A) in which the cap 60 is rotatable relative to the battery tray 28 and an assembled position (FIGS. 10B and 10C) in which the cap 60 is inhibited from rotating relative to the battery tray 28. The cap 60 may include a body 64, a flange 66, and a plurality of locking tabs 67. In the example illustrated, the body 64 has a hexagonal shape, which facilitates rotation of the cap 60 between the pre-assembly position and the assembled position. In one form, the body 64 is rotated manually such as with a tool, for example. In some forms, the body 64 may have a pentagonal shape, a square shape, or any other suitable shape that facilitates rotation of the cap 60.

The cap 60 has an opening 68 (labeled in FIGS. 5 and 7) that extends therethrough (i.e., the opening 68 extends through the body 64 and the flange 66). In the example illustrated, the opening 68 is a stepped opening defined by a first internal circumferential surface 70a at the body 64 and a second internal circumferential surface 70b at the flange 66. A diameter of the second internal circumferential surface 70b is greater than a diameter of the first internal circumferential surface 70a. In the example illustrated, a fluid regulating device 72 is disposed within the opening 68 and is secured to the cap 60. In the example provided, the fluid regulating device 72 is secured to the first internal circumferential surface 70a. In one form, the device 72 may be a permeable membrane that selectively allows some fluids to pass therethrough while inhibiting other fluids from passing through. For example, the permeable membrane may allow gases (e.g., air) to pass through while inhibiting liquids from passing through. In this way, the device 72 allows the venting of gases within the battery housing 28 that may be generated by a thermal event. In another example, the device 72 may be a valve (e.g., equalization valve) that operates to equalize the pressure across the valve. For example, if the pressure within the battery tray 28 increases due to a thermal event, for example, the valve activates to vent the pressurized gas within the battery tray 28 to ambient surroundings. Although the device 72 is shown secured to the first internal circumferential surface 70a, in some forms, the device 72 may be secured to other surfaces such as the second internal circumferential surface 70b, for example.

With reference to FIGS. 5-7, the flange 66 extends radially outward from an end of the body 64 and includes a first side 74 having a first surface 74a and a second side 75 having a second surface 75a. When the cap 60 is secured to the battery tray 28 in the assembled position (FIGS. 10B and 10C), the second surface 75a of the flange 66 abuts against a flat inner surface of the side walls 50 of the battery tray 28. The flange 66 also defines an annular groove 76 (FIGS. 5 and 7) and a plurality of openings 78 (FIG. 7). The annular groove 76 is formed in the second side 75 of the flange 66 and is configured to receive the seal 62. The openings 78 are formed in the flange 66 such that the openings 78 extend in an axial direction. The openings 78 also open through the first side 74 and the second side 75 of the flange 66. In the example illustrated, the openings 78 are circumferentially spaced apart around a central axis of the flange 66. In some forms, the openings 78 may cooperate to form a different pattern around the central axis of the flange 66. In the example illustrated, the openings 78 have a rectangular shape. In some forms, the openings 78 may have a circular shape, square shape or any other suitable shape.

The locking tabs 67 act as the engagement structure that couples the cap 60 to the battery tray 28. The locking tabs 67 are disposed within the annular groove 76 and are circumferentially spaced apart from each other around the flange 66. The locking tabs 67 have an arcuate profile and are also spaced apart from an inner circumferential surface 80 defining the annular groove 76 in the radial direction. As shown in FIGS. 10B and 10C, the locking tabs 67 are configured to engage respective tabs 56 of the battery housing 28 when the cap 60 is in the assembled position to inhibit movement of the cap 60 relative to the battery housing 28.

With reference to FIGS. 5-7, each locking tab 67 includes a spacer 82 and a resiliently flexible leg 84 having a barbed tip 88. The spacer 82 is disposed within the annular groove 76 of the flange 66. The spacer 82 also extends from an intermediate surface 86 that extends parallel to the surfaces 74a, 75a and that is located between the surfaces 74a, 75a. The flexible leg 84 extends outwardly from an end of the spacer 82 (e.g., cantilevered to the end of the spacer 82) such that a gap is between the flexible leg 84 and the intermediate surface 86. When the cap 60 is rotated from the pre-assembly position to the assembled position, a respective rectangular-shaped tab 56 of the battery housing 28 traverses the barbed tip 88 causing the flexible leg 84 to deflect outwardly (i.e., away from the intermediate surface 86) until the tab 56 engages a body 91 of the flexible leg 84. Once the tab 56 engages the body 91, the flexible leg 84 is allowed to return to its original state (i.e., undeflected state). In this way, the cap 60 is secured to the battery tray 28 and is inhibited from moving relative to the battery tray 28. In some forms, instead of the flexible legs 84, the cap 60 may include a threaded hub (not shown) extending from the flange 66 in an axial direction away from the body 64. In this way, the hub may be threadably secured to the battery tray 28 to inhibit movement of the cap 60 relative to the battery tray 28.

The seal 62 is made of a resiliently compressible material such as rubber, for example, and includes an annular seal body 90 and a plurality of bosses 92. The seal body 90 is disposed in the annular groove 76 of the flange 66 and is positioned in the axial direction between the upper surface 74a and the side walls 50 of the battery housing 28 when the cap 60 is in the assembled position. The seal body 90 is also positioned in the radial direction between the locking tabs 67 and the inner circumferential surface 80 of the flange 66. In the example illustrated, the flange 66 may optionally include triangular-shaped protrusions 94 that extend radially inwardly from and around the inner circumferential surface 80 such that a pointed end engages the seal body 90. In this way, the seal body 90 is radially set within the annular groove 76 and is inhibited from moving in the radial direction by the locking tabs 67 and the protrusions 94. In some forms, the protrusions 94 may have a different shape such as a square shape, a semi-circular shape or any other suitable shape that radially positions the seal body 90 in the annular groove 76.

The plurality of bosses 92 extend in an axial direction from the seal body 90 and are received in respective openings 78 of the flange 66. When the cap 60 is in the pre-assembly position (FIG. 9), the seal 62 is in a relaxed state in which the bosses 92 are flush with the upper surface 74a of the cap 60 or recessed from the upper surface 74a of the cap 60. When the cap 60 is rotated to the assembled position (FIGS. 10B and 10C), the seal 62 is in a compressible state (i.e., the seal 62 is compressed against the flange 66) in which the bosses 92 extend from respective openings 78 of the flange 66 and beyond the upper surface 74a of the flange 66. In this way, a portion of each boss 92 extending beyond the upper surface 74a of the cap 60 can provide for visual confirmation of a robust seal. Additionally, the portion of each boss 92 extending beyond the upper surface 74a of the cap 60 can also be measured, which facilitates determining the amount of compression of the seal 62. This, in turn, allows for the determination of a robust seal prior to assembling the remaining portion of the battery housing assembly 12, for example. In the example illustrated, the bosses 92 have a rectangular shape. In some forms, the bosses 92 may have a circular shape, a square shape, or any other suitable shape.

It should be understood that though the seal assemblies 16 are described herein with respect to a battery tray 28, the seal assemblies 16 may also be used in any application where determination of a robust seal is desired before complete assembly of a system or apparatus or before a leak test is performed (i.e., a leak test is a procedure of checking a system or apparatus for leaks and is typically carried out after at least a portion of the apparatus has been assembled). That is, it may be cumbersome and/or costly to disassemble an apparatus after detecting a leak in the apparatus during the leak test. The seal assemblies 16 of the present disclosure allows for the determination of a robust seal before the leak test is performed, thereby reducing the likelihood of needing to disassemble the apparatus after the performance of the leak test.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A seal assembly comprising:
   a cap including an engagement structure and an annular flange, the engagement structure disposed on an axial surface of the flange and configured to couple the cap to an enclosure, the flange defining a plurality of openings that are open through a first side of the flange and a second side of the flange; and
   a seal including a seal body and a plurality of bosses, the seal body engaging the second side of the flange, each boss being positioned in a respective opening of the plurality of openings, wherein the seal is compressible against the flange from a relaxed state in which the bosses are flush with the first side of the flange or recessed within the openings and a compressed state in which each boss extends from the respective opening beyond the first side of the flange.

2. The seal assembly of claim 1, wherein the openings are circumferentially spaced apart around a central axis of the cap.

3. The seal assembly of claim 1, wherein the cap includes a body and the flange extends radially outward from the body, and wherein the openings extend axially through the flange.

4. The seal assembly of claim 3, wherein the body comprises an air permeable membrane that selectively allows fluid to pass therethrough.

5. The seal assembly of claim 3, wherein the body comprises a vent valve that selectively allows fluid to pass therethrough.

6. The seal assembly of claim 3, wherein:
   the second side of the flange defines an annular groove; and
   the seal body is a ring received in the annular groove and the plurality of bosses extend from the ring.

7. The seal assembly of claim 3, wherein the engagement structure comprises a plurality of resiliently flexible legs extending from the axial surface of the flange and configured to couple the cap to the enclosure to inhibit movement of the cap relative to the enclosure.

8. The seal assembly of claim 7, wherein the resiliently flexible legs are circumferentially spaced apart around the flange.

9. The seal assembly of claim 1, further comprising the enclosure.

10. The seal assembly of claim 1, wherein the cap is made of a polymeric material.

11. A seal assembly comprising:
    an enclosure;
    a cap configured to engage the enclosure in a pre-assembly position in which the cap is rotatable relative to the enclosure and an assembled position in which the cap is inhibited from rotating relative to the enclosure, the cap comprising a body and a flange extending radially outward from the body, the body configured to selectively allow fluid to pass therethrough, and wherein a plurality of openings extend through the flange of the cap; and
    a seal including a seal body and a plurality of bosses, the seal body engaging the cap and each boss of the plurality of bosses being positioned in a respective opening of the plurality of openings,
    wherein when the cap is in the pre-assembly position, the bosses are flush with an upper surface of the cap or recessed from the upper surface of the cap, and when the cap is in the assembled position, the seal is compressed such that each boss extends through the respective opening and beyond an upper surface of the cap.

12. The seal assembly of claim 11, wherein the openings are circumferentially spaced apart around the flange of the cap.

13. The seal assembly of claim 11, wherein the body comprises an air permeable membrane that selectively allows fluid to pass therethrough.

14. The seal assembly of claim 11, wherein the body comprises a vent valve that selectively allows fluid to pass therethrough.

15. The seal assembly of claim 11, wherein:
the flange has an upper side that has the upper surface and a lower side that is opposite the upper side, and wherein the lower side defines an annular groove; and
the seal body is a ring and the plurality of bosses extend from the ring, the ring being received in the annular groove of the flange.

16. The seal assembly of claim 15, further comprising a plurality of resiliently flexible legs extending from the lower side of the flange and configured to engage the enclosure when the cap is in the assembled position to inhibit movement of the cap relative to the enclosure, the resiliently flexible legs located radially inwardly of the seal.

17. The seal assembly of claim 11, further comprising a plurality of resiliently flexible legs extending from a lower side of the flange and configured to engage the enclosure when the cap is in the assembled position to inhibit movement of the cap relative to the enclosure.

18. The seal assembly of claim 17, wherein the seal and the flange engage an outer flat surface of the enclosure when the cap is in the assembled position.

19. The seal assembly of claim 11, wherein the enclosure is a battery tray.

20. A seal assembly comprising:
a battery tray defining an aperture;
a cap received in the aperture and configured to engage the battery tray in a pre-assembly position in which the cap is rotatable relative to the battery tray and an assembled position in which the cap is inhibited from rotating relative to the battery tray, the cap comprising:
a body configured to selectively allow fluid to pass therethrough;
a flange extending radially outward from the body and including an upper side and a lower side, the lower side defining an annular groove, wherein a plurality of openings are circumferentially spaced apart around the flange and extend axially through the flange; and
a plurality of resiliently flexible legs extending from the lower side of the flange and configured to engage the battery tray when the cap is in the assembled position to inhibit movement of the cap relative to the battery tray; and
a seal engaging the cap and including a ring portion and a plurality of bosses extending from the ring portion, the ring portion disposed in the annular groove, the bosses positioned in respective openings of the flange, wherein when the cap is in the pre-assembly position, the bosses are flush with an upper side of the cap or recessed below the upper side of the cap, and when the cap is in the assembled position, the seal is compressed such that each boss extends through the respective opening and beyond an upper side of the cap.

* * * * *